March 29, 1960 G. E. LUND 2,930,902
PRIMED GATE USING BINARY CORES
Filed Feb. 14, 1955
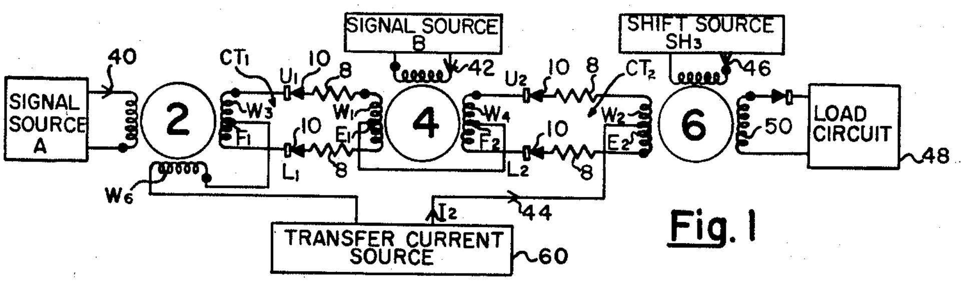
Fig. 1
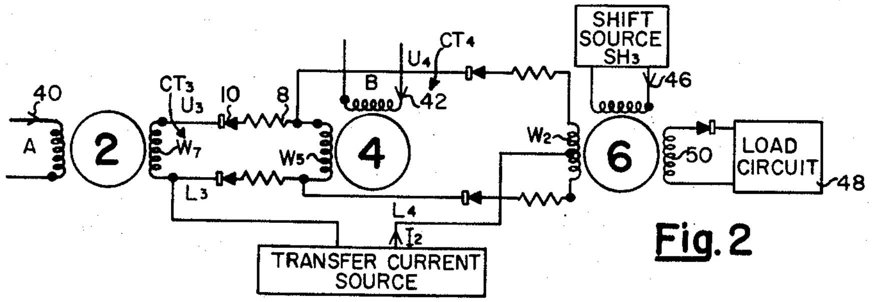
Fig. 2
| A | B | C |
|---|---|---|
| 0 | 0 | 0 |
| 0 | 1 | 0 |
| 1 | 0 | 0 |
| 1 | 1 | 1 |
Fig. 3a
| CONDITION | A | B | S' | C' |
|---|---|---|---|---|
| I | 0 | 0 | 0 | 0 |
| II | 1 | 0 | 1 | 0 |
| III | 0 | 1 | 1 | 0 |
| IV | 1 | 1 | 0 | 1 |
Fig. 4a
| A | B | A B | AVB | AΛB |
|---|---|---|---|---|
| 0 | 0 | 0 | 0 | 0 |
| 1 | 0 | 0 | 1 | 1 |
| 0 | 1 | 0 | 1 | 1 |
| 1 | 1 | 1 | 1 | 0 |
Fig. 4b
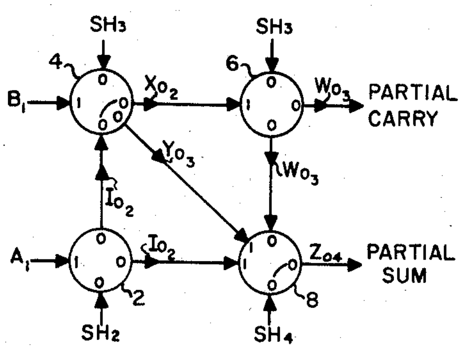
Fig. 4
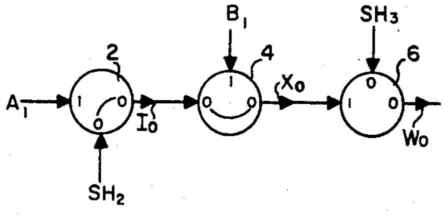
Fig. 3
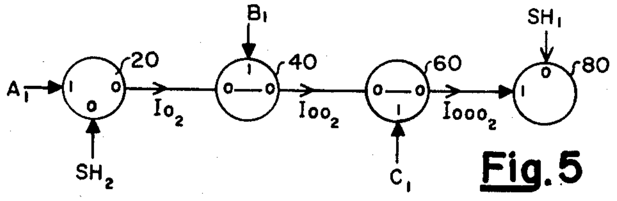
Fig. 5
INVENTOR.
GEORGE E. LUND
BY
George Baran
ATTORNEY

United States Patent Office 2,930,902

Patented Mar. 29, 1960

2,930,902

PRIMED GATE USING BINARY CORES

George E. Lund, Havertown, Pa., assignor to Burroughs Corporation, Detroit, Mich., a corporation of Michigan Application February 14, 1955, Serial No. 488,061

16 Claims. (Cl. 307—88)

This invention relates to magnetic switching circuits and more particularly to magnetic switching circuits for performing logical manipulations on input data.

Signals representative of the coincidence of two input signals are useful where the performance of logical data modifications in an electronic circuit is necessary. Circuits for producing the coincidence signals are known in the art as "and" or gating circuits. Prior art "and" circuits are known utilizing magnetic switching circuits, and have operated satisfactorily in performing the "and" function. However, these circuits have at times been difficult to combine with other circuits in logical systems because several operations are required at different times and critical circuits are required for obtaining coincidence in timing and suitable amplitudes of input pulses.

It is, therefore, an object of this invention to provide improved logical magnetic switching circuits.

Another object of the invention is to provide magnetic gating circuits having utility in logical systems.

In accordance with this invention, therefore, a magnetic circuit is provided for producing an output signal only in response to stored input signals at two binary magnetic switching elements. When an input signal at one magnetic element is used directly to switch another magnetic element in response to an existing storage condition in a further element, as accomplished in the logical system of this invention, the operation may be referred to as switching an element through an element. Thus, during a single transfer operation upon a chain of three cascade coupled elements, the first element may be switched thereby causing the second and third elements to be switched. However, if either the first or the second element is in such a storage condition that it is not switched, the third element is likewise not switched. Thus, the circuit stores the logical "and" function as the condition of the third element, which may be interrogated by conventional means at any desired time. The "and" circuit is useful in combination with other elements in logical systems to perform more complex logical operations such as a binary addition system afforded by one embodiment of the invention.

The invention and its mode of operation together with further objects and features of advantage are described in detail with reference to the accompanying drawings, in which:

Figure 1 is a schematic circuit diagram of an "and" circuit embodiment of the invention;

Figure 2 is a schematic circuit diagram of a further "and" circuit embodiment provided in accordance with the invention;

Figure 3 is a logical circuit diagram of an "and" circuit embodying the invention;

Figure 3*a* is a truth table for the "and" circuit of Figure 3;

Figure 4 is a logical circuit diagram of a serial binary half-adder circuit of the invention;

Figure 4*a* is a truth table for the serial binary half-adder circuit of Figure 4;

Figure 4*b* is an additional table illustrating logical steps performed in the half-adder; and Figure 5 is a logical diagram of a further embodiment of the invention.

Throughout the drawings block circuit diagrams are used to indicate well known circuits or circuit elements, whose details are not a part of the present invention, in order to more clearly indicate those features of novelty contributed by this invention. By convention, the magnetic cores are binary elements having a substantially rectangular hysteresis loop. A current entering the dotted end of an input winding associated with a magnetic core will tend to switch the core to a binary "0." A current entering the undotted end of an input winding, however, will tend to switch the core to a binary "1" state. Output pulses are obtained generally in response to the switching of a core from one state to another. Other notation is defined as the need arises in the subsequent description of the invention.

Figure 1 discloses the invention as it is applied to a cascade of three binary elements wherein core 6, the third core in the array, is switched upon the switching of the primed gate composed of binary cores 2 and 4. The primed gate requires that an output pulse from core 2 be made to switch core 4 and the output pulse of core 4, in turn, be made to switch core 6. Thus core 6 is contingent for the switching upon core 4 being in a predetermined or "receptive" state when core 2 switches. In effect, then, core 6 is switched during the same time interval by signals from the switching of core 2 through the circuit of core 4.

Assuming that at a first time period $T_1$, core 2 is placed in a "1" state by a signal from source A which causes current to flow in the direction of the arrow 40. Further assume that core 4 likewise has been set in a "1" state by a signal from source B which causes current to flow in the direction of arrow 42. Now during a second time period $T_2$, occurring any time after the arrival of both signals A and B, cores 2 and 4 are interrogated by pulses from the source 60 of transfer current $I_2$. As discussed later on in this specification, when no switching of either core 2 or core 4 takes place, transfer circuit current $I_2$ passes in the direction of arrow 44, into winding $W_2$ at point $E_2$ where it divides equally through the split windings of $W_2$ into an upper branch $U_2$ and a lower branch $L_2$ of the conditional transfer circuit $CT_2$. Diodes 10 and resistors 8 are in each branch $U_2$ and $L_2$ respectively. The two current branches merge and leave the conditional transfer circuit at point $F_2$ and the merged current enters another conditional transfer circuit $CT_1$ at point $E_1$. The current then splits equally into two branches of winding $W_1$, one branch of the current passing through the upper branch $U_1$ of conditional transfer circuit $CT_1$ and the other branch of the current passing through lower branch $L_1$. The equal opposing currents merge at point $F_1$ of winding $W_3$ and the merged current passes through winding $W_6$ and back to the transfer current source. The provision of two branch current flow paths in a coupling circuit between magnetic core elements, and particularly the use of tapped windings in such coupling circuit, is described and claimed in the application for patent of John O. Paivinen Serial No. 762,863, filed September 23, 1958, which application is a continuation of three earlier applications Serial Nos. 396,603, 396,605 and 420,135, filed respectively on December 7, 1953, December 7, 1953, and March 31, 1954, and assigned to the same assignee as the present application.

Core 4 will cause an output current differential in transfer loop $CT_2$ sufficient to switch core 6 if in response to the transfer current $I_2$ core 4 is switched from a "1" to a "0." Core 2 likewise will cause an output current differential in transfer loop $CT_1$ sufficient to switch core 4 if in response to the transfer current $I_2$ it is switched from a "1" to a "0" state. During a third successive time period $T_3$, core 6 is interrogated from shift source $SH_3$ and driven to a "0" state by a current pulse in the direction of arrow 46 to cause readout of the result into the load circuit 48 if a "1" is stored in core 6. Thus as core 6 switches from "1" to "0" at time $T_3$ an output potential is generated in winding 50 so that output current flows to the load circuit 48 out of the dotted end of winding 50.

Referring again to time period $T_2$, a transfer current pulse $I_2$ flows into the dotted terminal of winding $W_6$ on core 2 to tend to switch the core to a "0." If core 2 was in the "1" state when transfer pulse $I_2$ was applied, switching of core 2 takes place, and the output voltage induced in winding $W_3$ of core 2 is positive at the dot end, thus impressing a back bias on diode 10 of the upper branch $U_1$ of transfer loop $CT_1$. If core 4 had previously been placed in a "1" state by a signal pulse from signal source B, core 4 would be in a state to cause a current differential in transfer loop $CT_2$ when the portion of the transfer current $I_2$ through the lower branch $L_1$ of loop $CT_1$ (which portion is substantially larger than that through the upper branch $U_1$ due to the back-biasing of the diode 10 in the upper branch) causes core 4 to switch to a "0." The switching of core 4 induces a voltage in winding $W_4$ which is positive at the dot end, thus impressing a back-bias on diode 10 in the upper branch $U_2$ of transfer loop $CT_2$ and thus causing the larger portion of the transfer current $I_2$ to flow through the lower branch $L_2$, such larger current serving to switch core 6 to a "1" if it had previously been placed in a "0" state as a result of shift signals from shift source $SH_3$. By employing core 2 and core 4 in this manner one may, during a single time period $T_2$, obtain the switching of core 6 when core 2 switches through core 4. Hence core 4 acts as a primed gate, permitting the output of core 2 to be stored in core 6 only if core 4 is preset in the "1" state.

The diagram of Figure 1 employs transfer circuits $CT_1$ and $CT_2$ for carrying out the above noted switching of a core 6 from core 2 through core 4. When a core of an array of cores switches, it is desirable that an output signal of the switched core be transferred to a further core in a desired direction along the array. A switched core will create a magnetic field which cuts all the windings about the core and serves to induce currents in the cut windings. The transfer circuits are designed to use induced currents of only one polarity to represent signals. In order to transfer only those signals induced at a particular time in a specified winding in the influence of said magnetic field, a conditional transfer circuit is employed for passing a conditional transfer current from an external current source through the winding. Because the conditional transfer circuit is used, switching of a core at any other time than during the presence of the conditional transfer current will not produce an output signal in the transfer circuit. This prevents transfer of spurious signals at any time the conditional transfer current is not flowing and in this manner permits complex logical functions of the type described above to be performed.

Thus to obtain the assurance that no spurious signals will be transferred to core 6 upon the switching of core 4 by signal B, a source of transfer current $I_2$ enters at terminal $E_2$ of the conditional transfer circuit $CT_2$ after the signal B expires. As can be seen, the current entering at $E_2$ splits into two branches, one branch $U_2$ comprising the upper section of winding $W_2$, resistor 8, rectifier 10, the upper section of winding $W_4$ and junction $F_2$. Current similarly flows in the lower branch $L_2$. From $F_2$ the current $I_2$ enters the conditional transfer circuit $CT_1$ at junction $E_1$ where it splits, like it did in transfer circuit $CT_2$, into an upper branch $U_1$ and a lower branch $L_1$. The current $I_2$ emerges at junction $F_1$ and enters the shift winding $W_6$ before it returns to the transfer current source.

Directing attention to the transfer circuit $CT_1$, it is seen that as long as core 2 does not switch to state "0" by means of shift winding $W_6$ the current in the upper branch $U_1$ equals the current in the lower branch $L_1$. These currents create equal flux linkages which oppose each other in the two sections of both windings $W_1$ and $W_3$. Thus there is no resultant flux available in winding $W_1$ to switch core 4. The resistors 8 dampen out slight momentary misbalance of components in the two branches. The rectifiers prevent circulating current flow in the branches of the conditional transfer circuits in the absence of conditioning current $I_2$.

Assume that core 2 is in a "1" state and core 4 is also in a "1" state so that the gate comprising cores 2 and 4 is primed. The switching of core 2 will permit core 4 to switch and the output pulse from core 4 will switch core 6 through conditional transfer circuit $CT_2$. When core 2 is made to switch to a "0" at a time period $T_2$ by the application of a shifting pulse from the transfer current source to winding $W_6$, then a current will be induced in winding $W_3$ that will tend to oppose this shift. Thus a current will be induced in $W_3$ that will tend to shift core 2 back into the "1" state. Such a current will enter winding $W_3$ through its undotted end. The equal currents in branch $U_1$ and branch $L_1$ disappear and the lower branch $L_1$ of $CT_1$ will carry more current than the upper branch $U_1$. This is clearly seen because the induced current in the lower branch of $W_3$ of $CT_1$ enhances the normal transfer current $I_2$ whereas the induced current in the upper branch of $W_3$ of $CT_1$ opposes the normal transfer current $I_2$. This current differential flows through the lower branch of winding $W_1$ entering a dotted end and leaving the non-dot end of said branch. Such a current will induce a "0" into core 4 which is in a "1" state. Thus core 4 will switch to a "0" in the presence of its load, conditional transfer loop $CT_2$, as a consequence of the current induced in winding $W_1$. When core 4 switches to a "0," the current induced in winding $W_4$ will be such as to oppose the switch of core 4 to a "0." This opposition will result in a net current flow in winding $W_4$ that enters $W_4$ through the undotted end of the winding. This induced current, like the induced current in $CT_1$, will cause the lower branch $L_2$ of $CT_2$ to have more current flowing through it than flows through upper branch $U_2$. This current differential will result in net current entering the undotted portion of winding $W_2$ so as to switch core 6 (already in a "0" state) to a "1." The gated output signal is thus stored in core 6, and a voltage is induced in winding 50 by the switching of core 6 to a "0" by shift source $SH_3$, which induced voltage may be used to drive any suitable load 48.

The conditional transfer circuit is a safeguard in carrying out the basic operation of switching a core through a core. This safeguard assures the transfer of information from one core to another, without unwanted feedback of spurious pulses, since there is no transfer of information through the conditional transfer loops $CT_1$ and $CT_2$ unless there is current flow through said loops simultaneous with the switching of a core.

Figure 2 presents a modification of the embodiment of Figure 1 wherein less windings are needed to effectuate the primed gate function set out in Figure 1. The pulse $I_2$ from the transfer current source enters winding $W_2$ at a time period $T_2$ and splits into an upper branch $U_4$ and lower branch $L_4$ of conditional transfer loop $CT_4$. The lower branch $L_4$ is in series with lower branch $L_3$ of $CT_3$ and upper branch $U_4$ is in series with upper branch $U_3$ of conditional transfer loop $CT_3$. When switching does not take place, the current in branch $L_4$ equals that in branch $U_4$ and that in branch $L_3$ equals the current in branch $U_3$. When a shifting pulse $I_2$ is applied at a time period $T_2$ to core 2 after core 2 has been set to a "1," core 2 switches to a "0" because pulse $I_2$ enters winding $W_7$ through its dotted terminal. Winding $W_7$, in opposing this switch, will cause current in the dotted end of winding $W_7$ to decrease. Thus the shifting of core 2 disturbs the balance in $CT_3$ so that more current now flows in lower branch $L_3$ than in upper branch $U_3$ of conditional transfer loop $CT_3$. Such a differential in current flow will cause resultant current to flow into the dotted end of winding $W_5$ and tend to shift core 4 to a "0."

The shift of core 4 to a "0" will induce a voltage in winding $W_5$ that will oppose this shift to a "0." The opposition current will decrease the current entering the dotted end of winding $W_5$ causing current in branch $L_4$ of conditional transfer loop $CT_4$ to be greater than the current in branch $U_4$ of conditional transfer loop $CT_4$. The unbalance in conditional transfer loop $CT_4$ is now such as to cause a resultant current flow from the midpoint to the dot end of $W_2$, such resultant current flow tending to shift core 6 to a "1."

The embodiment of Figure 2 uses only one split winding whereas that of Figure 1 relies on four split windings. Thus four windings may replace nine windings with this embodiment. Both embodiments assure a transfer of information from one core to another only when two conditions are met concurrently, namely, when a transfer current is being sent through the conditional transfer loops and upon the switching of a core.

Figure 3 is a symbolic drawing of the hereinbefore described primed gate as it is to be employed as a fundamental building block in computer circuits for performing the logical gate function of this invention. At time $T_1$, a pulse from signal source A stores a "1" in core 2. The "eyebrow" connection of a "0" to a "0" in cores 2 and 4 is diagrammatic shorthand for the conditional transfer operation where only when the core is switched to a "0" by the shift winding denoted by the eyebrow connection will the switched core yield an output current pulse at the output winding designated by the eyebrow connection. At time $T_1$, or any time before time $T_2$, a "1" is stored in core 4 if pulse B is present. Likewise a "1" is stored in core 2 by presence of pulse $A_1$. At time $T_2$ the core 2 is switched by a shift pulse $SH_2$ to produce an output current $I_0$. The eyebrow symbol in core 4 states diagrammatically that only if 4 is switched to "0" by the output pulse $I_0$ from core 2 will there be an output pulse $X_0$ from core 4. The output pulse $X_0$ from core 4 will store a "1" in core 6. The stored information in core 6 represents $A \cdot B$ (A and B). Now if core 6 is switched by a shifting pulse $SH_3$ at time period $T_3$, the core 6 will produce an output signal $W_0$.

The truth table of Figure 3*a* indicates the four possible settings of cores 2 and 4 with signals A and B, and indicates that signal C is only present at core 6 under the condition $A \cdot B$. Therefore the primed gate produces the "and" function which may be useful as a carry signal in a half-adder circuit. Thus, when core 6 is shifted after $A \cdot B$ is stored in it a carry results. The operation of a half-adder circuit embodying the invention will be described hereinafter in connection with Figure 4. It is noted that the output pulse $X_0$ need not be used to switch a core, but may be employed to drive any load. Moreover the input pulse $I_0$ going into primed core 4 need not be the output signal of a core but could be the output signal of any source of binary pulses.

It is also contemplated to extend this primed gate to include the switching of a core through a plurality of cores. The teaching of this invention therefore embraces the use of a primed gate as a tool wherever multiple coincidence circuits are employed. Figure 5 teaches that core 80 could be switched by core 20 through two cores 40 and 60. Input pulses $A_1$, $B_1$, and $C_1$, store in cores 20, 40, and 60, respectively, the "1" signal. If core 20, upon the application of a shifting pulse $SH_2$ switches and finds cores 40 and 60 each in the "1" state when it transmits output pulse $I_{02}$, then core 40 will switch to create output pulse $I_{002}$, said pulse $I_{002}$ will switch core 6 to create output pulse $I_{0002}$, thus setting core 80 to a "1." The primed gate is readily extended to encompass a multiple gating circuit so that the "and" operation ($A \cdot B \ldots N$) is performed in only two time periods, one being for setting the gate, and the other being for performing the logical function. A third time period may be required to clear the cores should no coincidence occur.

In the field of logic, one is faced with the problem of mechanizing into electronic circuitry directly certain mathematic processes or logical operations. This mechanization should be composed of as few parts as possible, comprise elements that are relatively inexpensive, and yet be speedy and reliable in operation. The instant invention provides for circuitry employing very few and inexpensive elements yet is speedy and efficient in operation.

Figure 4*a* shows a truth table for a binary system of logic notations showing the conditions necessary to obtain the sum $S^1$ and carry $C^1$ from input binary signals A and B. Thus, truth table of Figure 4*a* shows the partial sum and partial carry for each possible combination of two input binary digits. A partial sum $S^1$ requires the logical relationship that A or B be present, but not A and B. The logic A or B but not A and B is written symbolically as $A \wedge B$. $A \wedge B$ is called an "exclusive or" relationship because a sum is present only when A or B is present but not when A and B are both present. $A \vee B$, as shown in Figure 4*b*, is called an "inclusive or" relationship because it includes not only either A or B but also A and B.

The truth table of Figure 4*a* requires that a partial $C^1$ be derived when both A and B exist. A partial carry is therefore an "and" circuit and a partial sum is an "exclusive or" circuit. The binary cores of Figure 4 provide a simplified system for carrying out this logic.

Figure 4 shows cores 2, 4, and 6 forming the primed gate circuit discussed above employed in a manner so as to produce a partial carry. Binary core 8 is connected with binary core 2 and its function is to produce the partial sum required in the half-adder. Shifting pulses represented by the letters $SH_1$, $SH_2$, $SH_3$, and $SH_4$ are pulses that occur at times $T_1$, $T_2$, $T_3$ and $T_4$ and are periodic pulses or clock pulses that are applied to the cores 2–8 for the purpose of interrogating and clearing said cores of their stored information by tending to switch them to a "0" state. If a core is in a "1" state at the time of arrival of the shifting pulse $SH_1$ the core will be cleared of its information and be set to a "0" and will yield an output signal. If a core is in a "0" state when the shifting pulse arrives, the core will remain in the "0" state and no output signal is obtained.

Condition I of Figure 4*a* represents the condition at $SH_1$ when all the cores have been cleared to a "0" and there is no input signal $A_1$ or $B_1$. Thus, there is no storage or transfer of information nor any output signals from the cores.

Condition II of Figure 4*a* represents the situation at $T_1$ when a "1" is read into core 2 by signal input $A_1$. At time $T_2$, the shifting pulse $SH_2$ tries to switch core 6 through core 4 from core 2. However core 4 is in a "0" state so no transfer can take place through it, leaving core 6 also in a "0" state. Core 8, in parallel with core 2, is switched to a "1" by output signal $I_0$ from core 2. A conventional transfer circuit is indicated (without the eyebrow notation) so that a single shift winding will cause an output signal at two different windings connected with respective cores 4 and 8. Likewise shifting pulse $SH_3$ occurring at time period $T_3$ at 4 and 6 does not produce an output signal because said cores are in a "0" state. The shifting pulse $SH_4$ appearing at time period $T_4$ is applied to core 8. The eyebrow notation shows the obtaining of an output pulse $Z_{04}$ from core 8 only when pulse $SH_4$ is applied to the core. Therefore, output pulse $Z_{04}$, in conformity with condition II of truth table of Figure 4*a*, will represent the partial sum $S^1$.

Condition III of Figure 4*a* discloses that at time $T_1$, a pulse $B_1$ reads a "1" into core 4. At time $T_2$, pulse $SH_2$ tries to operate the primed gate by switching core 6 through core 4 from core 2. However core 2 is in a "0" state so the gate is closed. Core 4 is thus left in a "1" state. At a time period $T_3$, pulse $SH_3$ is applied to cores 4 and 6. Pulse $SH_3$ does not affect core 6 since core 6 is already in a "0" state, but it does read out the "1" from core 4 into core 8, output pulse $Y_{03}$ from core 4 being the input pulse for core 8. At a time period $T_4$, pulse $SH_4$ is applied to core 8 and the output pulse $Z_{04}$ is the result of the reading out of said core, said output pulse representing the required partial sum $S^1$ for condition III.

For condition IV it is noted that at a time period $T_1$ input pulse signal $A_1$ is read into core 2 and input signal $B_1$ is read into core 4 so that cores 2 and 4 are each put in the binary "1" state. At a time period $T_2$, pulse $SH_2$ is applied to core 2, said pulse switching core 2 to a "0" state so as to produce an output $I_{02}$ which will switch core 4, causing core 4 to produce an output pulse $X_{02}$, so as to switch core 6 from "0" to "1." At the same time that core 6 has been switched by core 2 through core 4, an output $I_{02}$ from core 2 reads a "1" into core 8. Core 4 is now in a "0" state and so is core 2 in a "0" state.

At the time period $T_3$, pulse $SH_3$ is applied to cores 4 and 6. Core 4 is not switched by pulse $SH_3$ since the former is in a "0" state. However, pulse $SH_3$ reads the "1" out of core 6 to produce the output pulse $W_{03}$ or the required partial carry $C^1$ of Figure 4*a*. A further output pulse $W_{03}$ at time period $T_3$ from core 6 to core 8 resets core 8 to a "0." At the time period $T_4$, pulse $SH_4$ is applied to core 8 and since core 8 is in a "0" state, no output pulse occurs, hence no partial sum is obtained from core 8.

It is noted at this point that for the purpose of clarity, pulse $SH_4$ at time period $T_4$ is applied only to core 8. The same pulse $SH_4$ applied to core 8 could be applied simultaneously at time period $T_1$ when cores 2 and 4 have input signals because the reading in of a "1" to cores 2 and/or 4 does not affect the reading out of core 8. The output pulse $Y_{03}$ from core 4 to core 8 by pulse $SH_3$ at a time period $T_3$ for condition III of Figure 4*a* was represented as a conventional unconditional output circuit.

In summary it is noted that core 8 is located in the array of magnetic cores so as to hold an "inclusive or" signal $A \vee B$, the "inclusive or" logic indicating the presence of either A or B, or both A and B. The "exclusive or" logic represents the presence of either A or B, but not both A and B. A partial carry $(A \cdot B)$ output pulse occurs in core 6. The half-adder of Figure 4 permits not only an "and" output $A \cdot B$ from core 6 to produce a carry output, but a further output $A \cdot B$ from core 6 cancels any "1" stored in core 8 by virtue of the presence of both A and B. This "1" stored in core 8 must be removed from core 8 before a $SH_4$ pulse is applied to core 8 so that one may carry out the logic shown in Fig. 4*a*, namely, that the "inclusive or" input to core 8 must be changed to an "exclusive or" before an output (partial sum) at core 8 is obtained. This produces the $A \wedge B$ output which the truth table of Figure 4*a* verifies as a partial sum output S.

A particular advantage of the instant half-adder lies in the fact that a partial carry $A \cdot B$ occurs under the same conditions (see condition IV of Figure 4*a*) which cause $A \vee B$ to differ from $A \wedge B$ so that the partial carry output can be used to cancel the spurious $A \vee B$ condition and obtain thus an $A \wedge B$ condition. Figure 4*b* reveals that the logic of a half-adder requires an "and" circuit to produce a partial carry and an "exclusive or" circuit to produce a partial sum. The mechanization of this partial carry and partial sum is carried out quickly and with relatively few elements when binary cores are utilized with the primed gate of the herein described invention.

Although the fundamental novel features of this invention have been shown and described, it will be understood that various omissions and substitutions and changes in the form and details of the device illustrated and in its operation may be made by those skilled in the art without departing from the spirit of the invention. Those features therefore believed descriptive of the invention are defined with particularity in the following claims.

What is claimed is:

1. An array of three binary cores interconnected by transfer circuit means for coupling the first core to the second core and the second core to the third core, means for selecting the storage state of the second of said three binary cores, means for switching the first of the three cores so as to produce an output signal, said output signal switching said second core only upon the presence in said second core of said selected storage state, and means to utilize the output signal produced by said switching of the second core to switch the third core, the transfer means including a first output winding associated with said first core, a first input winding associated with said second core, a first rectifier connected between the first end terminals of the first input and first output windings, a second rectifier connected between second end terminals of said first input and first output windings, said first input winding serving also as an output winding for said second core, an input winding for said third core, a third rectifier connecting the first end terminal of said first input winding with the first end terminal of said third-core input winding, a fourth rectifier connecting the second end terminal of said first input winding with the second end terminal of said third-core input winding, and means for passing current through all of said windings so that the resultant current changes affecting said cores are substantially zero when none of said cores are being switched.

2. An array of three binary cores interconnected by transfer circuit means for coupling the first core to the second core and the second core to the third core, means for selecting the storage state of the second of said three binary cores, means for switching the first of the three cores so as to produce an output signal, said output signal effecting switching of said second core only upon the presence in said second core of said selected storage state, and means to utilize the output signal produced by said switching of the second core to effect switching of the third core, the transfer means including a first tapped output winding associated with said first core, a first tapped input winding associated with the second core, a first rectifier connected between the first end terminals of the first input and first output tapped windings, a second rectifier connected between second end terminals of said first input and first output tapped windings, a second tapped output winding associated with said second core, a second tapped input winding associated with said third core, a third rectifier between the first end terminals of said second output and second input windings, a fourth rectifier connected between second end terminals of said second output and second input windings, and means for passing current simultaneously through all of said windings so that the resultant current changes affecting said cores are substantially zero when none of said cores are being switched.

3. A half-adder circuit comprising four bistable magnetic elements, each of the first two elements adapted to be set to either its "1" or "0" state, means for interrogating one of said first two elements at time $t_1$ of a sequence of interrogating periods, means for interrogating the second element of said first two elements at time $t_2$ of said sequence so as to read out the state of said second element, first means for transmitting the "AND" logic of the first and second elements to said third element, second means for transmitting the "inclusive or" logic of the first and second elements to said fourth element, means for interrogating the third element at time $t_3$ so as to produce a first output pulse from said third element representative of the "partial carry" of said first two elements as well as a second output pulse for switching said fourth element to its "0" state, such switching of said fourth element serving to cancel the "inclusive or" signal stored in said fourth element, and means for interrogating said fourth element at time $t_4$ so as to switch said fourth element to its "0" state, such switching of the fourth element at time $t_4$ producing an output pulse representative of the "partial sum" of said first two elements had there been no "partial carry" signal stored in said third element.

4. A half-adder circuit comprising four bistable magnetic elements, input circuits coupled to the first and second of said elements, said first and second elements being switched to their respective "1" states upon the application of signal pulses to said input circuits, a first transfer circuit coupling the first and second elements, a second transfer circuit coupling the second and third elements, a third transfer circuit coupling the first element with said fourth element, a fourth transfer circuit coupling the third element with said fourth element, and a fifth transfer circuit coupling the second and fourth elements, means for applying switching energy to said first element so as to produce output pulses in said first and third transfer circuits should said first element be in its "1" state at the time of application of such switching energy to said first element, the output pulse in the third transfer loop serving to switch the fourth element to its "1" state and the output pulse in said first transfer circuit serving to switch said second element to its "0" state to produce an output in said second transfer circuit should said second element be in its "1" state when said output pulse is produced in the first transfer circuit, the output pulse in said second transfer circuit serving to switch said third element to its "1" state, means for applying switching energy to said third element so as to switch out a "1" stored in said third element and produce an output pulse in said fourth transfer circuit, said output pulse serving to switch said fourth element to its "1" state, and means for interrogating said fourth element.

5. A half-adder circuit comprising four bistable magnetic elements, a first transfer circuit coupling the first element to the second element, a second transfer circuit coupling the second element to the third element, a third transfer circuit coupling the first element to the fourth element, a fourth transfer circuit coupling the third element to the fourth element, a fifth transfer circuit coupling the second element to the fourth element, input means for setting either or both of said first and second elements to their respective "1" states, means for applying at time $t_1$ switching energy to said first element so as to switch the latter to its "0" state and produce output pulses in said first and third transfer circuits only if a "1" has been stored in said first element, the output pulse in said third transfer circuit switching the fourth element to its "1" state and the output pulse in the first transfer circuit switching the second element to its "0" state only if said second element were set to its "1" state by an input pulse applied to said input means, the switching of said second element to its "0" state producing an output pulse in said second transfer circuit to switch said third element to its "1" state, means for applying switching energy to said second element at time $t_2$ so as to switch said second element to its "0" state had there been a "1" stored in said second element, such switching of the second element producing output pulses in said second and fifth transfer circuits and serving to switch the third and fourth elements, respectively, to their "1" states, means for applying switching energy to said third element at time $t_3$ to switch said third element to its "0" state so as to produce one output pulse in said fourth transfer circuit which serves to switch said fourth element to its "0" state and another output pulse representative of the partial carry of the said inputs to said first and second elements, and means for applying switching energy to said fourth element at time $t_4$ to switch said fourth element to its "0" state, such switching to its "0" state serving to produce an output pulse representative of the partial sum of said first and second elements.

6. A half-adder circuit comprising four bistable magnetic elements, a first transfer circuit coupling the first element to the second element, a second transfer circuit coupling the second element to the third element, a third transfer circuit coupling the first element to the fourth element, a fourth transfer circuit coupling the third element to the fourth element, a fifth transfer circuit coupling the second element to the fourth, input circuits to the first and second elements adapted to set said first and second elements to their respective "1" states upon application of a signal pulse to each of said input circuits, means for applying switching energy to said first element so as to produce output pulses in said first and third transfer circuit only upon the presence of a "1" in said first element, the output pulse in said third transfer loop serving to switch said fourth element to its "1" state and the output pulse in said first transfer circuit serving to switch said second element to its "0" state and produce an output in said second transfer circuit only when a "1" has been stored in said second element due to the presence of a signal pulse at the input circuit of the second element, the output pulse in said second transfer circuit serving to switch said third element to its "1" state, means for applying switching energy to said third element so as to produce a first output pulse representing a partial carry of said binary inputs to the first and second elements, as well as a second output pulse in said fourth transfer circuit should said third element be in its "1" state at the time of application of such switching energy to it, such output pulse in the fourth transfer circuit serving to switch said fourth element to its "0" state, and means for applying switching energy to said fourth element to test whether said element is in its "1" or "0" state.

7. A switching circuit comprising in combination, a binary magnetic storage element having two stable states of magnetic remanence, an input information transfer circuit coupled to said element, an output information transfer circuit coupled to said element, means for simultaneously passing transfer current serially through both said transfer circuits, each of said transfer circuits comprising a pair of balanced unidirectional current paths each with a winding tending to create equal and opposite flux in said element, means for establishing the binary storage condition of said element in a predetermined one of its two states, means for applying input signals to said input information transfer circuit so as to tend to switch said element to its other stable state, and means including at least one winding on said element electrically connected to both said transfer circuits and adapted to pass said transfer current for switching the predetermined storage state of said binary element in response to the presence of a signal at the input transfer circuit and in response to the storage condition of said binary element to pass a signal to the output transfer circuit, to thereby pass a signal through the element to the output circuit only in response to the conjunctive presence of a predetermined element storage state and an input signal.

8. A switching circuit comprising in combination, a binary magnetic storage element having two stable states of magnetic remanence, an input information transfer circuit coupled to said element, an output information transfer circuit coupled to said element, means for simultaneously passing transfer current serially through both said transfer circuits, said element having a single winding electrically connected in both said transfer circuits, each of said transfer circuits comprising a pair of unidirectional current paths respectively electrically connected to each end of the said single winding, means for establishing the binary storage condition of said element in a predetermined one of its two states, means for applying input signals to said input information transfer circuit so as to tend to switch said element to its other stable state, and means including at least said single winding on said element electrically connected in both said transfer circuits and adapted to pass said transfer current for switching the predetermined storage state of said binary element in response to the presence of a signal at the input transfer circuit and in response to the storage condition of said binary element to pass a signal to the output transfer circuit, to thereby pass a signal through the element to the output circuit only in response to the conjunctive presence of a predetermined element storage state and an input signal.

9. A logical "AND" circuit not requiring coincidence of input signals, said circuit comprising: first, second and third magnetic cores each capable of assuming either of two stable states of magnetic remanence one of which is a reference state; a first balanced transfer loop interconnecting said first and second cores; a second balanced transfer loop interconnecting said second and third cores, each of said transfer loops including an output winding coupled to one of the two cores it interconnects and an input winding coupled to the other, each of said windings having a tap at substantially its midpoint, each of said transfer loops also including a first asymmetrically conducting device connecting one end of said output winding to one end of said input winding and a second asymmetrically conducted device connecting the other end of said output winding to the other end of said input winding; conductive means connecting together the midpoints of the input and output windings of said second core, thereby to conductively connect said first and second transfer loops; a switching winding coupled to said first core; means connecting one end of said switching winding to the midpoint of the output winding of said first core; first input signal means for selectively placing said first core in one or the other of its stable states according to the presence or absence of a proper input signal during a first time period, said first core being placed in its non-reference state in the presence of such signal; second input signal means for selectively placing said second core in one or the other of its stable states according to the presence or absence of a proper signal during a second time period which may be either concurrent in whole or in part or non-concurrent with said first time period, said second core being placed in its non-reference state in the presence of such signal; means for placing said third core in its reference state during a third time period which may be either concurrent in whole or in part or non-current with said first and second time periods; and means for connecting between the other end of said first-core switching winding and the midpoint of said third-core input winding a source of transfer current pulse during a fourth time period which follows said first, second and third time periods, for switching said third core to its non-reference state only in response to a voltage induced in said second core by the switching thereof to its reference state in response to a voltage induced in said first core by the switching thereof to its reference state in response to the passage of a transfer current pulse through its switching winding, whereby said third core is switched only if both said first and second cores were in their non-reference state at the time of application of said transfer current pulse.

10. A logical "AND" circuit as claimed in claim 9 characterized in the provision of load means responsive to the switching of said third core from one of its states to the other.

11. A logical "AND" circuit not requiring coincidence of input signals, said circuit comprising: first, second and third cores each capable of assuming either of two stables states of magnetic remanence; a first transfer loop interconnecting said first and second cores; a second transfer loop interconnecting said second and third cores, each of said transfer loops including an output winding coupled to one of the two cores it interconnects and an input winding coupled to the other, each input winding having a tap at substantially its midpoint; asymmetrically conducting means included in each of said transfer loops for preventing current flow therearound; conductive means connecting together said input and output windings of said second core, thereby to conductively connect said first and second transfer loops; first input signal means for selectively placing said first core in one or the other of its stable states during a first time period; second input signal means for selectively placing said second core in one or the other of its stable states during a second time period which may be concurrent in whole or in part or non-concurrent with said first time period; means for placing said third core in a predetermined reference state during a third time period which may be either concurrent in whole or in part or non-concurrent with said first and second time periods; and means connected between the midpoint of said third-core input winding and said first-core output winding for passing, during a fourth time period which is subsequent to said first, second and third time periods, a transfer current pulse serially through said first and second transfer loops for switching said third core only in response to the voltage induced in the output winding of said second core as a result of the switching thereof, said second core switching only in response to the voltage induced in the output winding of said first core by the switching thereof, thereby to switch said third core only if both said first and second cores switch in response to said transfer current pulse.

12. A logical "AND" circuit according to clam 11 characterized in the provision of load means responsive to the switching of said third core.

13. A logical "AND" circuit not requiring coincidence of input signals, said circuit comprising: first, second and third magnetic cores each capable of assuming either of two stable states of magnetic remanence one of which is a reference state; a first transfer loop interconnecting said first and second cores, said first transfer loop comprising an output winding coupled to said first core, an input winding coupled to said second core, and asymmetrically conducting means for preventing current flow around said loop; a second transfer loop interconnecting said second and third cores, said second transfer loop comprising said second-core input winding and a center-tapped input winding coupled to said third core, said second transfer loop also including asymmetrically conducting means for preventing current flow around said second loop; first input signal means for selectively placing said first core in its non-reference state in response to a first input signal received during a first time period; second input signal means for selectively placing said second core in its non-reference state in response to a second input signal received during a second time period which may be concurrent in whole or in part or non-concurrent with said first time period; and means connected between the output winding of said first core and said center tap of said third-core input winding for passing a transfer current pulse serially through said first and second transfer loops, said transfer current dividing into parallel branch paths in each loop, the direction of said current being such that said first and second cores tend to switch to their reference state, the circuit arrangement and parameters being such that if either said first or second core is already in said reference state and does not switch in response to said transfer current pulse the winding associated therewith offers relatively low impedance to said transfer current pulse and the impedances of said parallel branch paths remain substantially equal to each other, in which case substantially equal currents flow through the two sections of said third-core center-tapped input winding, thereby impressing substantially equal and opposing magnetizing forces on said third core, said circuit arrangement and parameters being such that if both said first and second cores tend to switch in response to said transfer current the winding associated with each of said first and second cores offers relatively high impedance to said transfer current and the impedances of said parallel branch paths become unequal in which case the currents through said two sections of said third-core input winding exert sufficiently unequal magnetizing forces on said third core to switch said third core.

14. Apparatus as claimed in claim 13 characterized in the provision of load means responsive to the switching of said third core.

15. A logical "AND" circuit not requiring coincidence of input signals, said circuit comprising: first, second and third cores each capable of assuming either of two stable states of magnetic remanence one of which is a reference state; a first transfer loop interconnecting said first and second cores; a second transfer loop interconnecting said second and third cores, said first and second transfer loops being conductively connected together, each of said transfer loops including winding means coupled magnetically to each of said interconnected cores of that loop, at least the winding means of said second transfer loop which is coupled magnetically to said third core comprising a pair of substantially similar windings joined together at a common junction; first input signal means for selectively placing said first core in its non-reference state during a first time period; second input signal means for selectively placing said second core in its non-reference state during a second time period which may be concurrent in whole or in part or non-concurrent with said first time period; preset or read-out means for placing said third core in its reference state during a third time period which may be concurrent in whole or in part or non-concurrent with said first and second time periods; asymmetrically conducting means included in each of said transfer loops for preventing current flow therearound when the cores associated therewith are switched in response to said input signals or to said preset means; and means connected to the more remote ends of said first and second transfer loops for passing, during a fourth time period which is subsequent to said first, second and third time periods, a transfer current pulse serially through said first and second transfer loops through parallel branch paths of each loop and in a direction to switch at least said first core to its reference state for inducing, in the event of said first core tending to switch in response to said transfer current pulse, a back voltage tending to reverse bias an asymmetrically conducting means in one of said branch paths of said first transfer loop, thereby to divert transfer current into the other branch path of said first transfer loop, said diverted current passing through winding means associated with said second core in a direction to switch said second core to its reference state for inducing, in the event of said second core tending to switch in response to said diverted current, a back voltage which tends to reverse bias an asymmetrically conducting means in one of the branch paths of said second transfer loop, thereby to divert current into the other branch path of said second transfer loop through one of said pair of substantially similar windings associated with said third core, said last-mentioned diverted current flowing in a direction to switch said third core from its reference to its other state.

16. Apparatus as claimed in claim 15 characterized in the provision of output means responsive to the switching of said third core.

References Cited in the file of this patent

UNITED STATES PATENTS

| | | |
|---|---|---|
| 2,519,513 | Thompson | Aug. 22, 1950 |
| 2,697,178 | Isborn | Dec. 14, 1954 |
| 2,729,807 | Paivinen | Jan. 3, 1956 |
| 2,741,758 | Cray | Apr. 10, 1956 |
| 2,779,934 | Minnich | Jan. 29, 1957 |